Oct. 9, 1951  H. ZIMMERMAN ET AL  2,570,625
MAGNETIC TOY BLOCKS
Filed Nov. 21, 1947  2 Sheets-Sheet 1
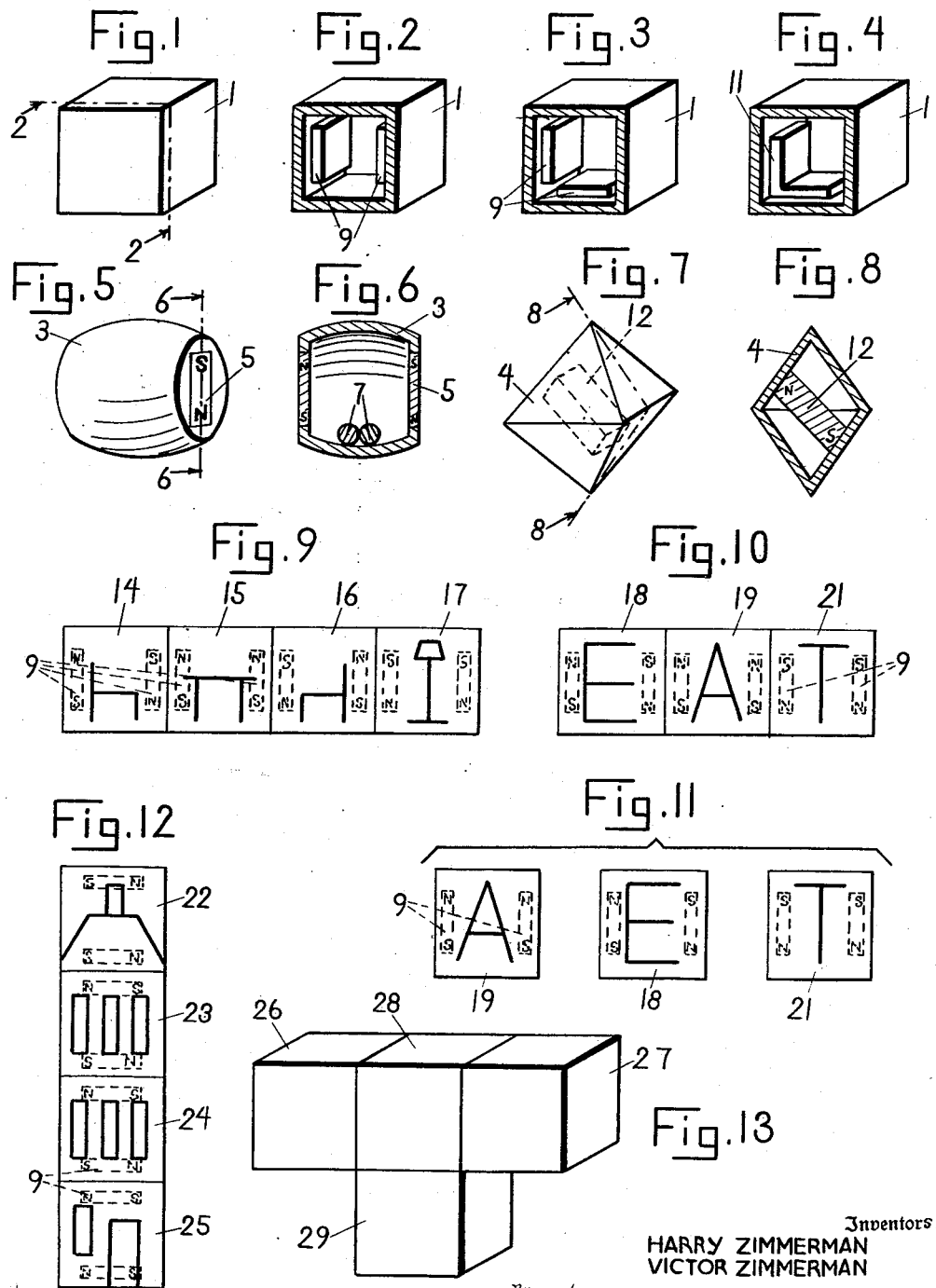
Inventors:
HARRY ZIMMERMAN
VICTOR ZIMMERMAN
By
Attorney Oct. 9, 1951  H. ZIMMERMAN ET AL  2,570,625
MAGNETIC TOY BLOCKS
Filed Nov. 21, 1947  2 Sheets-Sheet 2

Inventors:
HARRY ZIMMERMAN
VICTOR ZIMMERMAN

Attorney

Patented Oct. 9, 1951

2,570,625

UNITED STATES PATENT OFFICE 2,570,625

MAGNETIC TOY BLOCKS

Harry Zimmerman, New York, and Victor Zimmerman, Elmhurst, N. Y.

Application November 21, 1947, Serial No. 787,296

2 Claims. (Cl. 46—24)

Our invention relates to that type of toys which comprises a set of blocks or bricks to be assembled or placed together by the player.

Objects of our invention are to provide a toy of this type with novel, surprising, entertaining and educational features, to provide a set of several blocks that cling or adhere to each other in properly assembled position, and to provide clinging blocks which can be easily separated.

Other objects are to provide several blocks that can be placed together only in one or in several arrangements or sequences, but that can not be assembled in other arrangements or sequences, to provide several blocks that will attract each other in certain arrangements and will repel each other in other arrangements, and thereby to enforce the selection of definite arrangements.

Further objects are to provide sides of the blocks with pictures, letters or other representations of suitable subjects, to provide the blocks with different representations distinguishing the blocks, to use representations of correlated subjects whereby definite arrangements of the blocks bring these subjects into definite serial relationships, either of a logical or reasonable nature or of a meaningless or unreasonable nature, to co-ordinate the reasonable series of subject representations with arrangements of blocks in which the blocks cling together, and to co-ordinate unreasonable series with arrangements in which the blocks repel each other.

Still other objects are to build figures or complex bodies, using forces of attraction for the connection of the individual blocks forming these figures or bodies, to use attracting or repelling forces or both for balancing blocks, to make possible the erection of buildings that can not be built of ordinary blocks having no attracting or repelling properties, to provide a set of blocks adapted for the erection of a large variety of figures, and to facilitate the erection of figures of a novel and surprising nature.

Still other objects and advantages will appear from the following description of exemplifying embodiments of our invention, from the appended claims and from the accompanying drawing in which:

Fig. 1 shows a perspective view of a cubic block which, together with other cubic blocks, constitutes an illustrative embodiment of our invention.

Figs. 2, 3 and 4 show three perspective views of modifications of the block shown in Fig. 1, these modifications differing in the arrangements of magnets, the front wall of the block, in each of these views being cut away along the plane indicated by the broken line 2—2 in Fig. 1.

Fig. 5 shows a perspective view of a barrel-shaped block which may be used instead of the block shown in Fig. 1.

Fig. 6 shows a cross-section taken along the plane indicated by line 6—6 in Fig. 5.

Fig. 7 shows a perspective view of another, differently shaped block which may be used instead of the block shown in Fig. 1.

Fig. 8 shows a cross-section taken along the plane indicated by the broken line 8—8 in Fig. 7.

Figs. 9 and 10 show front views of two illustrative embodiments of our invention in assembled condition.

Fig. 11 shows a front view of the embodiment shown in Fig. 10, the blocks being arranged in non-connectable sequence.

Fig. 12 shows a front view of another embodiment in which the blocks are positioned in a vertical row.

Figs. 13 to 18 show six perspective views of different figures or buildings which can be made of blocks of the type shown in Fig. 1.

Figure 14:
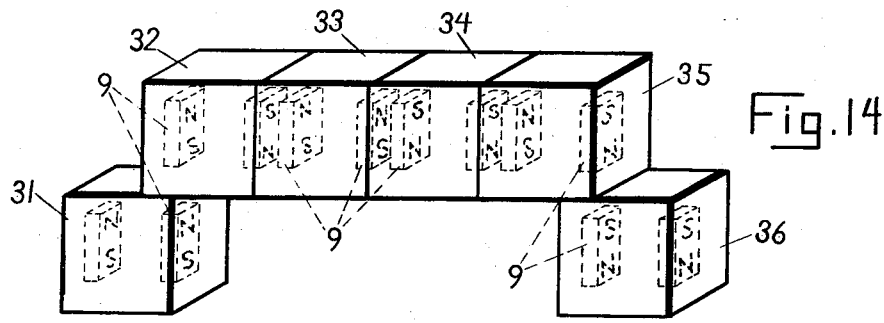

Each block of a set constituting an embodiment of our invention has a geometrically simple or regular outer shape. For example, this shape may form a cube 1 as shown in Fig. 1, a barrel 3 as shown in Fig. 5, or an octahedron or double-pyramid 4 as shown in Fig. 7. Preferably, a set consists of identically shaped blocks. Each block has one or, preferably, more flat sides whereby the blocks can be placed closely beside each other.

According to our invention, some sides of the blocks are provided with magnetism. This can be done in any suitable manner. For example, the magnetic sides themselves may be totally or partially made of magnetic material, or these sides may be made of non-magnetic material and may receive their magnetic quality from magnets positioned within the block. For example, magnets 5 form parts of the flat surfaces of the blocks 3 as shown in Figs. 5 and 6 while all other figures exemplify blocks with inner magnets.

Preferably, the blocks are hollow. Movable members, for example, little balls 7 may be confined in a block's inner space whereby the block can be used as a rattle in addition to the uses which will be described later. Or a magnet loosely confined in a block may be used for a rattling effect. By shaking or turning the block, such a loose magnet can be brought into a position where the magnet magnetizes one or more sides of the block. Thereby, different sides of blocks can be selected for magnetization. For example, the magnet 11 shown in Fig. 4 may be loose. Preferably, however, the inner magnets are affixed, for example, glued to the inner surfaces of block side walls.

The magnets may extend along side walls of the blocks or across the inner space from one side wall to another wall. For example, the block 4 contains a magnet 12 having a north pole contacting one side wall of this block and having a south pole contacting the opposite side wall whereby two opposite sides of the block are differently polarized. Figs. 2, 3 and 4 exemplify blocks with magnets positioned along side walls.

Each of the embodiments of blocks shown in the latter figures comprises a hollow cube 1. These embodiments differ in the arrangements of the magnets. In Fig. 2, two straight magnets 9 are positioned along inner surfaces of opposite side walls. In Fig. 3, the magnets 9 are positioned along meeting side walls. In Fig. 4, an angular magnet 11 extends along two meeting side walls. Instead of these exemplifying arrangements, any other arrangement of magnets of any desired shape and number may be used.

The north-south directions of the magnets in different blocks of a set is preferably different. The blocks may have sides showing letters, pictures or other representations or marks whereby the front side and the upright position of each block is defined. A cubic block marked in this manner and having magnets 9 arranged in the manner illustrated by Fig. 2 may show any of the four following types of magnetic polarization:

In the first type, the left magnet has its north pole near the upper edge of the left block side while the right magnet has its north pole near the lower edge of the right block side. This type is represented by the block 14 in Fig. 9 and by the block 18 in Fig. 10. In the second type, both magnets have their north poles near the upper edges of the respective sides. This type is represented by the blocks 15 and 19. In the third type, both magnets have their north poles near the lower edges of the respective sides. This type is represented by the blocks 17 and 21. In the fourth type, the left magnet has its north pole near the lower edge and the right magnet has its north pole near the upper edge of the adjacent side. This type is represented by the block 16.

Preferably, a set of blocks comprises blocks of different types. A set of this kind may be arranged in a row in different manners, the sequence of the blocks permitting many permutations or combinations. Due to the magnetism of the facing block sides, only some of these combinations will cling together, while, in other combinations, facing block sides will repel each other. Thereby connectable arrangements are distinguished from not connectable ones. The front sides of the blocks may show representations which are reasonably correlated when arranged in any connectable sequence, but which cannot be connected in an unreasonable sequence.

For example, the set shown in Fig. 9 shows pictures of pieces of furniture which can be magnetically connected in the shown arrangement or in some permutations of this arrangement. Some further permutations are impossible. Neither of the blocks 14 and 16 representing chairs can be placed with the chair's back toward the table shown on block 15. The block 17 showing a lamp may be placed at either side of the table, but will be repelled when placed immediately in front of a chair where the lamp post would be in the way of the legs of a person sitting on the chair.

The embodiment shown in Fig. 10 comprises blocks showing letters of the alphabet. These letters can be magnetically connected in three ways, spelling Eat as in Fig. 10 or spelling Ate or Tea. These connections spell correct English words. The three remaining permutations of the same letters do not spell English words and, in each of these latter permutations, the blocks do not allow close alinement because at least two blocks repel each other by magnetic force. For example, Fig. 11 shows the same blocks in a sequence where all facing magnetic sides repel each other.

Fig. 12 shows an embodiment comprising four cubic blocks 22 to 25 on the front surfaces of which parts of a house are pictured. Magnets 9 are positioned in these blocks in the same manner as in the blocks shown in Figs. 9 to 11, except that, in Fig. 12, these magnets extend horizontally adjacent to the upper and lower side walls of the blocks whereby this set is adapted for vertical connection. The magnetism enforces correct arrangement of the blocks. The blocks 23 and 24 representing stories of the house are interchangeable and omittable. They can, however, not be placed over the block 22 representing the roof, nor under the block 25 representing the door and ground floor of the house. Obviously, these conditions are the result of the magnetic polarizations of the blocks.

In addition to the selective connections of the kind exemplified by Figs. 9, 10 and 12, a set of blocks according to our invention makes it possible to erect an unusually large variety of different compilations of blocks and many configurations which ordinary toy blocks cannot form. Figs. 13 to 18 show only a few typical examples of such configurations. These examples use, exclusively, blocks 1 provided with magnets 9 arranged as shown in Fig. 2. It is obvious that the building possibilities can be increased still more by providing blocks of different shapes and blocks provided with differently positioned magnets.

Fig. 13 exemplifies a structure with freely overhanging blocks 26 and 27. These blocks are magnetically connected to a median block 28 which is placed on top of a block 29.

Fig. 14 shows a bridge made of differently polarized blocks and held together by magnetic forces. The polarizations of the blocks 32 and 35 are of the first type mentioned before. The polarizations of the blocks 31 and 33 are of the second type. The blocks 34 and 36 belong to the third type of polarization.

Figure 15:
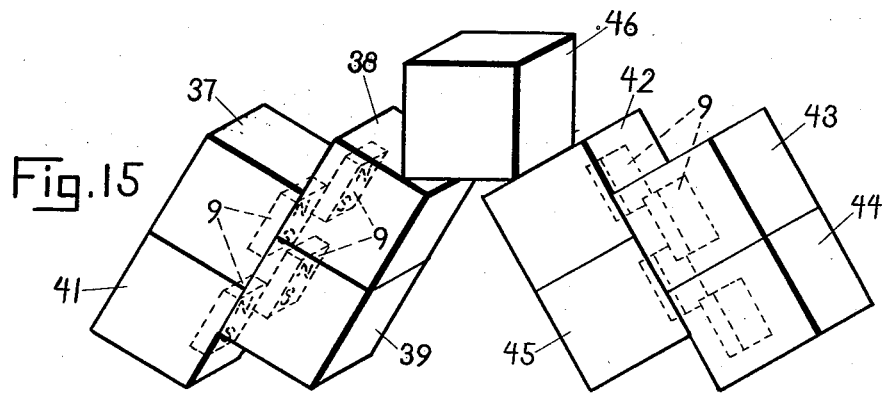

Fig. 15 exemplifies a structure where block sides polarized in the same direction are magnetically connected in overlapping positions. This arrangement brings the north pole of one block side into the attracting vicinity of the south pole of the adjacent side of an overlapping block. For example, the north pole of the right magnet of the block 37 is attracted by the south pole of the left magnet of the block 38. Attraction further exists between the south pole of the right side of the blocks 37 and the north pole of the left side of the blocks 39, and between the north pole of the right side of the blocks 41 and the south pole of the left side of the blocks 39. These magnetic forces consolidate the figure formed by the blocks 37, 38, 39 and 41 whereby this figure is stable in an oblique position.

The blocks 42 to 45 form a figure positioned symmetrically to the first figure formed by the blocks 37, 38, 39 and 41. The blocks 42 to 45 are magnetically connected in corresponding manner. Both figures may be independent from each other or may have a common top formed by a block 46 placed on the blocks 38 and 42.

Figures 16, 17:
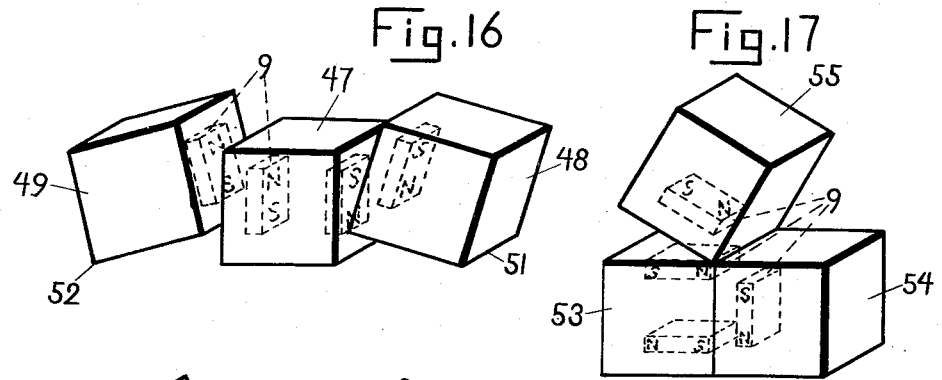

Fig. 16 exemplifies the use of repellent magnetism for balancing blocks. The block 47 is stably positioned. The block 48 is obliquely positioned at a small distance from the block 47. Equally polarized sides of these blocks face each other. The repellent magnetism of these sides balances the weight of the block 48 whereby this block is held in the shown position. The angle of this oblique position of equilibrium of the block 48 can be varied by varying the distance between the two blocks. The block 48 can rock or oscillate around its supporting edge 51 from one side of the position of equilibrium to the other.

The block 49 is positioned symmetrically to the block 48 and is balanced in corresponding manner in an oblique position over the supporting edge 52.

Fig. 17 shows two blocks 53 and 54 placed aside of each other and a block 55 obliquely positioned on the adjacent upper edges of the blocks 53 and 54. The weight of the block 55 is lifted by repellent magnetism whereby this block is balanced.

Figure 18:
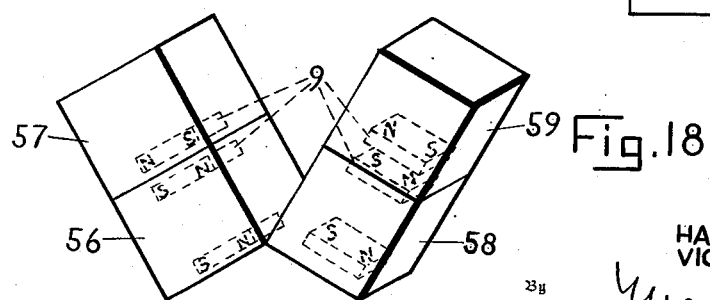

Fig. 18 shows a column consisting of blocks 56 and 57 held together by magnetic attraction, and another similar column made of blocks 58 and 59. The facing lower edges of the lower blocks 56 and 58 contact each other whereby the two columns support each other in oblique positions, and the blocks 56 to 59 form a configuration of V-shape.

We desire it understood that our invention is not confined to the particular embodiments shown and described, the same being merely illustrative, and that our invention may be carried out in other ways without departing from the spirit of our invention as it is obvious that the particular embodiments shown and described are only a few of the many that may be employed to attain the objects of our invention.

Having described the nature of our invention, what we claim and desire to protect by Letters Patent is:

1. A set of toy blocks each provided with indicia on the front face thereof, magnetic means on said blocks providing a magnetic field at each of the opposite side faces thereof, said blocks being of a plurality of types, one of said types of blocks having the magnetic fields at the opposite sides thereof polarized in the same direction, and another of said types of blocks having the magnetic fields at the opposite sides thereof polarized in opposing directions whereby said blocks are attracted to each other in side by side relation in a predetermined sequence so that the indicia thereon will be arranged in a selected order.

2. A set of toy blocks comprising blocks formed with indicia on the front faces thereof, permanent bar magnets on said blocks at each of the opposite sides thereof, said blocks being of a plurality of types, the bar magnets at the opposite sides of the blocks of one of said types being disposed with their polarity extending in the same directions, and the bar magnets at the opposite sides of the blocks of another of said types being disposed with relatively reversed polarity whereby said blocks of said plurality of types are attracted to each other in side by side relation in a predetermined sequence so that the indicia thereon will be arranged in a selected order.

HARRY ZIMMERMAN.
VICTOR ZIMMERMAN.

REFERENCES CITED

The following references are of record in the file of this patent:

UNITED STATES PATENTS

| Number | Name | Date |
|---|---|---|
| 756,625 | Haefele | Apr. 5, 1904 |
| 1,236,234 | Troje | Aug. 7, 1917 |
| 1,237,728 | Tuck | Aug. 21, 1917 |
| 1,736,134 | Rutherford | Nov. 19, 1929 |